April 24, 1934.  E. A. VIAL  1,955,842
COOKING UTENSIL
Filed July 28, 1933
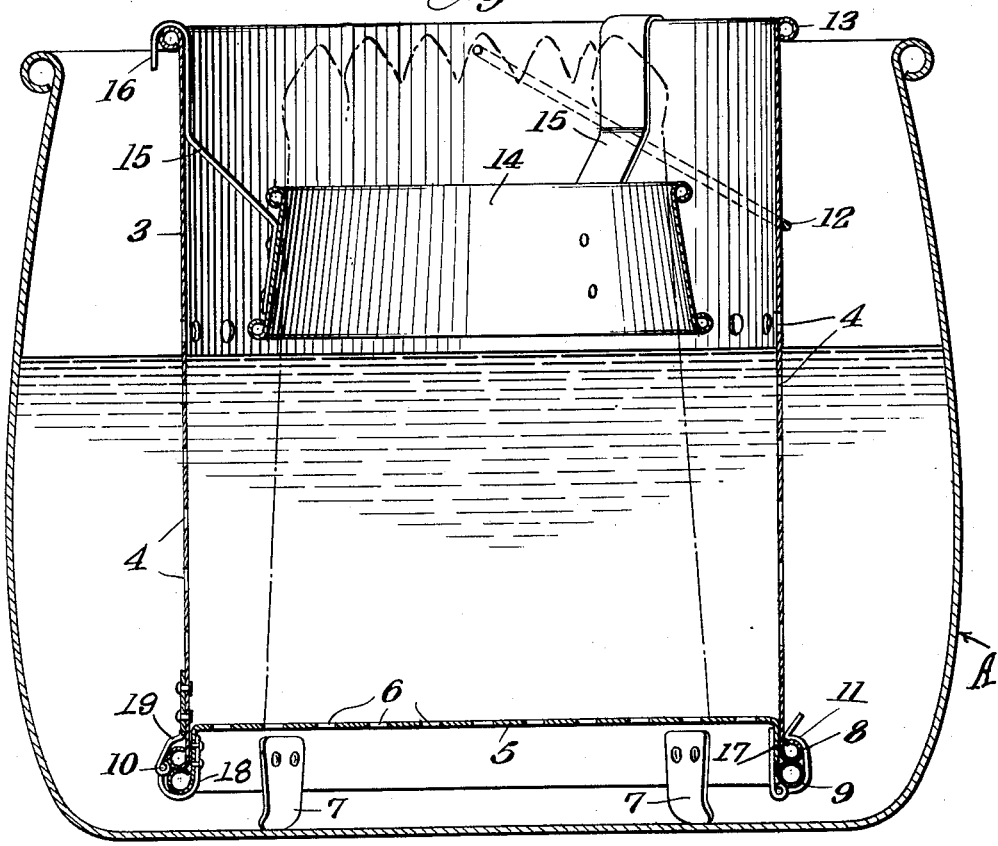
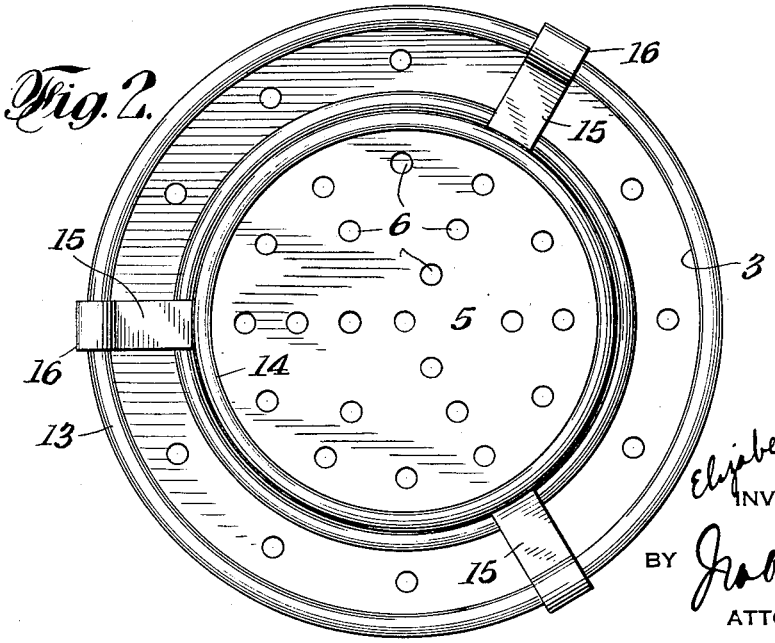
Elizabeth Ann Vial
INVENTOR
BY
ATTORNEY Patented Apr. 24, 1934

1,955,842

UNITED STATES PATENT OFFICE 1,955,842

COOKING UTENSIL

Elizabeth Ann Vial, New York, N. Y.

Application July 28, 1933, Serial No. 682,546

4 Claims. (Cl. 53—1)

This invention relates to cooking utensils, and more particularly to devices for boiling vegetables, fruits, and the like.

Heretofore, it has been the practice, in cooking vegetables such as asparagus, to place the vegetables in a vessel of boiling water. The turbulent action caused by the ebullition of the water has a tendency to disintegrate the vegetables, and cause them to fall apart into small pieces. This is undesirable and makes it inconvenient to remove the vegetables from the utensil. For example, in the cooking of asparagus, the stalks are harder than the tips; and when asparagus is cooked in boiling water, the tips cook before the stalks, with the result that the tips, being very soft, fall off of the stalks, and it is difficult to remove the asparagus from the utensil.

It is an object of this invention to provide a utensil for cooking asparagus and other vegetables in a manner to prevent disintegration of the vegetables during boiling.

A further object is the provision of a cooking utensil having means to facilitate the removal of vegetables therefrom, and also having means to properly support vegetables while being cooked.

These and other objects are attained by the novel construction, combination and arrangement of parts hereinafter described and shown in the accompanying drawing, constituting a material part of this disclosure and in which:

Fig. 1 is a sectional elevational view of my device.

Fig. 2 is a plan view of the device.

Referring to the drawing, in Fig. 1, the cooking utensil is shown to comprise a casing 3, preferably cylindrical in shape, and having a plurality of apertures 4, which extend to a point slightly above the midpoint of the casing.

The lower edge of the casing 3 is provided with a circumferential bead 8 for a purpose hereinafter explained.

The bottom of the utensil consists of a circular plate 5 having a plurality of apertures 6 therein. The plate 5 has a downturned flange 17 with a bead 9 at its edge; and secured to the flange 17 is one element 18 of a hinge which is pivotally connected by a pin 10 to the other element 19 of the hinge, the element 19 being attached to the casing 3. Diagonally opposite of the hinge is a latch 11 which is pivotally supported by the flange 17 and cooperates with the bead 8 to hold the bottom plate 5 in position relative to the casing 3.

Also attached to the flange 17 are supporting legs 7 which space the utensil from the bottom of a vessel A, as shown in Fig. 1. The casing 3 is provided with a bail 12 to facilitate its removal from the vessel A.

The upper edge of the casing 3 is provided with a circumferential bead 13, which receives a plurality of hooks 16, the latter being integral with braces 15, which in turn are attached to a frusto-conical tubular member 14. The braces 15 are of such a length as to position the member 14 above the apertures 4 in the casing 3.

In using the device, for example in the cooking of asparagus, the asparagus is placed in a vertical position, as indicated by dotted lines in Fig. 1, in the casing 3, the tips passing through the member 14. The utensil is then placed into a vessel A containing water to a level just to or slightly below the uppermost circle of apertures 4. When the water boils, it is obvious that the tips of the asparagus will not come into contact with the boiling water. Only the stalks of the asparagus will be cooked by the boiling water; the tips are cooked by the steam and water vapor, with the result that the tips and stalks are cooked evenly; that is, the tips will not be cooked before the stalks as is the case when the asparagus is completely covered by boiling water.

In my device, the member 14 maintains the asparagus in an upright vertical position, and prevents it from spreading to various positions in the casing 3.

When the asparagus has been sufficiently cooked, the utensil is removed from the vessel A, the apertures 4 and 6 allowing the water to drain off. To remove the asparagus from the utensil, the latch 11 is disengaged from the bead 8, to release the bottom 5, which allows the asparagus to fall downwardly in an orderly fashion on to a platter.

From the above description it will be seen that I have provided a simple and effective utensil for properly cooking asparagus. While I have described my device with especial application to the cooking of asparagus, it is clear that the utensil may readily be used for cooking other vegetables, fruits, and the like without departing from the spirit of the invention.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim as new and desire to secure by Letters Patent, is

1. A cooking utensil, comprising a cylindrical casing having a plurality of apertures therein, a bottom having a plurality of apertures and hingedly connected to the casing, a latch for releasably holding the bottom in position on the casing, a plurality of braces supported by the upper edge of the casing, and a frusto-conical tubular member attached to said braces and positioned above the midpoint of the casing.

2. A cooking utensil, comprising a casing having a plurality of apertures therein, said apertures extending from the lower edge of the casing to a point slightly above the midpoint of the casing, a bottom hingedly connected to the casing, and a tubular member supported by the casing and positioned above the midpoint of the casing.

3. A cooking utensil, comprising a casing having a plurality of apertures therein, said apertures extending from the lower edge of the casing to a point not exceeding two-thirds the height of the casing, a bottom hingedly connected to the casing, and a vegetable supporting and positioning collar supported by the casing and positioned in the casing so that the lower edge of the collar is on a level with or above the uppermost row of apertures in the casing.

4. A cooking utensil, comprising a casing having a plurality of apertures therein, said apertures extending from the lower edge of the casing to a point not exceeding two-thirds the height of the casing, and a vegetable supporting and positioning collar supported by the casing and positioned in the casing above said apertures, said collar being constructed to enable vegetables to pass therethrough so that a portion of the vegetables will be positioned in the casing below the collar.

ELIZABETH ANN VIAL.